April 1, 1952  N. J. PETERS ET AL  2,591,601
BARREL TYPE COOKER
Filed Oct. 17, 1949  4 Sheets-Sheet 1

INVENTORS
Norman J. Peters
Warren Bradley
BY
Quarles & French
Attys.

April 1, 1952  N. J. PETERS ET AL  2,591,601
BARREL TYPE COOKER
Filed Oct. 17, 1949  4 Sheets-Sheet 3

INVENTORS
Norman J. Peters
Warren Bradley
BY
Charles & French
Att'ys

April 1, 1952 N. J. PETERS ET AL 2,591,601
BARREL TYPE COOKER
Filed Oct. 17, 1949 4 Sheets-Sheet 4
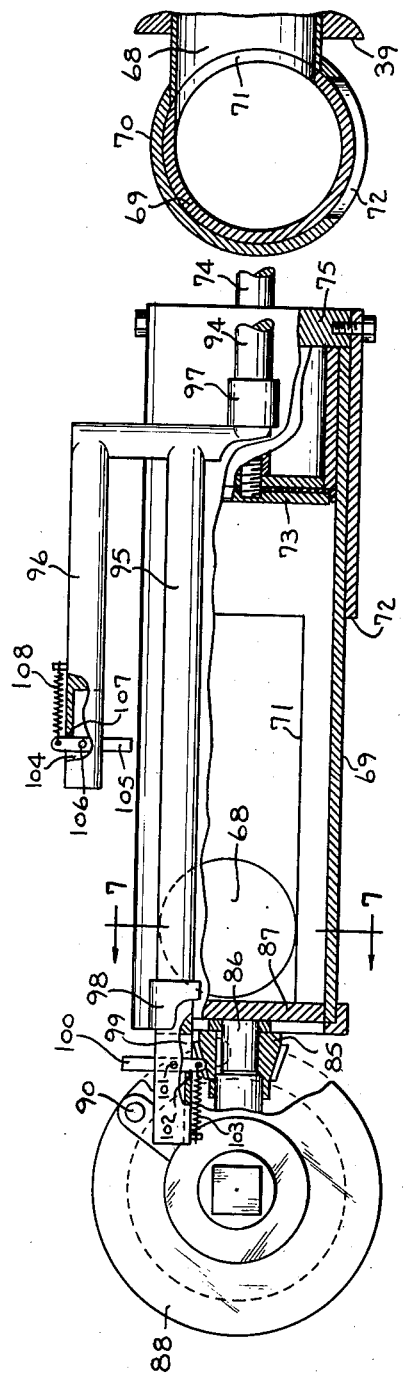
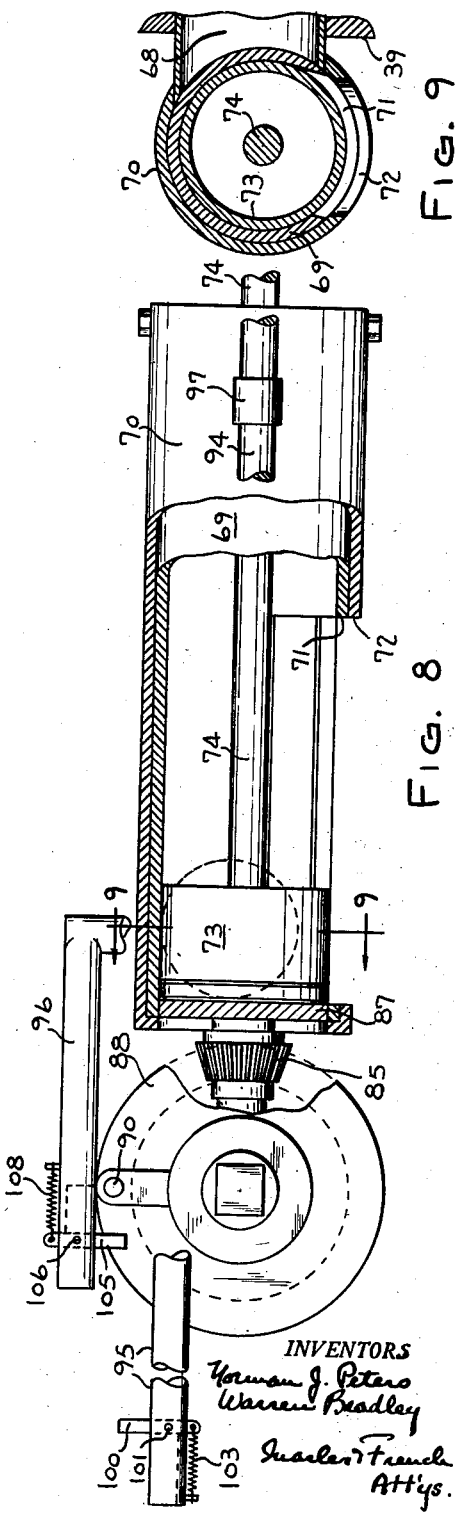
INVENTORS
Norman J. Peters
Warren Bradley
Charles T. French
Att'ys.

Patented Apr. 1, 1952

2,591,601

UNITED STATES PATENT OFFICE 2,591,601

BARREL TYPE COOKER

Norman J. Peters and Warren Bradley, Fond du Lac, Wis., assignors to Damrow Brothers Company, Fond du Lac, Wis., a corporation of Wisconsin Application October 17, 1949, Serial No. 121,772

3 Claims. (Cl. 259—9)

The invention relates to cookers and more particularly to a horizontal barrel type cooker for cooking sample batches of processed cheese or other materials requiring heating by steam, direct or indirect, accompanied by stirring or agitation.

One of the objects of the invention is to provide a cooker having a cylindrical barrel with a feed screw eccentrically mounted in the barrel so as to space portions of the same from the walls of the barrel to allow the material being cooked to work back and forth in the barrel and thus providing more agitation, faster cooking, and better mixing of the constituents of the batch. The eccentricity of the screw may be varied to suit different kinds of materials being cooked.

A further object of the invention is to provide yieldably mounted scraper means associated with the feed screw to prevent the material being cooked from "burning" on the walls of the barrel, particularly when indirect steam heat is used for heating the barrel.

A further object of the invention is to permit ready removal of the feed screw and scraper assembly by hinging the front plate to the barrel and providing easily disassembled bearings for the feed screw.

A further object of the invention is to provide an automatic measuring device at the outlet of the cooker so that a definite amount of the material can be measured when the consistency thereof and a definite time period is taken into account.

The invention further consists in the several features hereinafter set forth and more particularly defined by claims at the conclusion hereof.

In the drawings:

Fig. 6 is a front elevation view of the measuring device, parts being broken away and parts being shown in section;

Fig. 7 is a vertical sectional view taken on the line 7—7 of Fig. 6;

Fig. 8 is a view similar to Fig. 6 showing the parts in a discharging position;

Fig. 9 is a vertical sectional view taken on the line 9—9 of Fig. 8;

Figure 1:
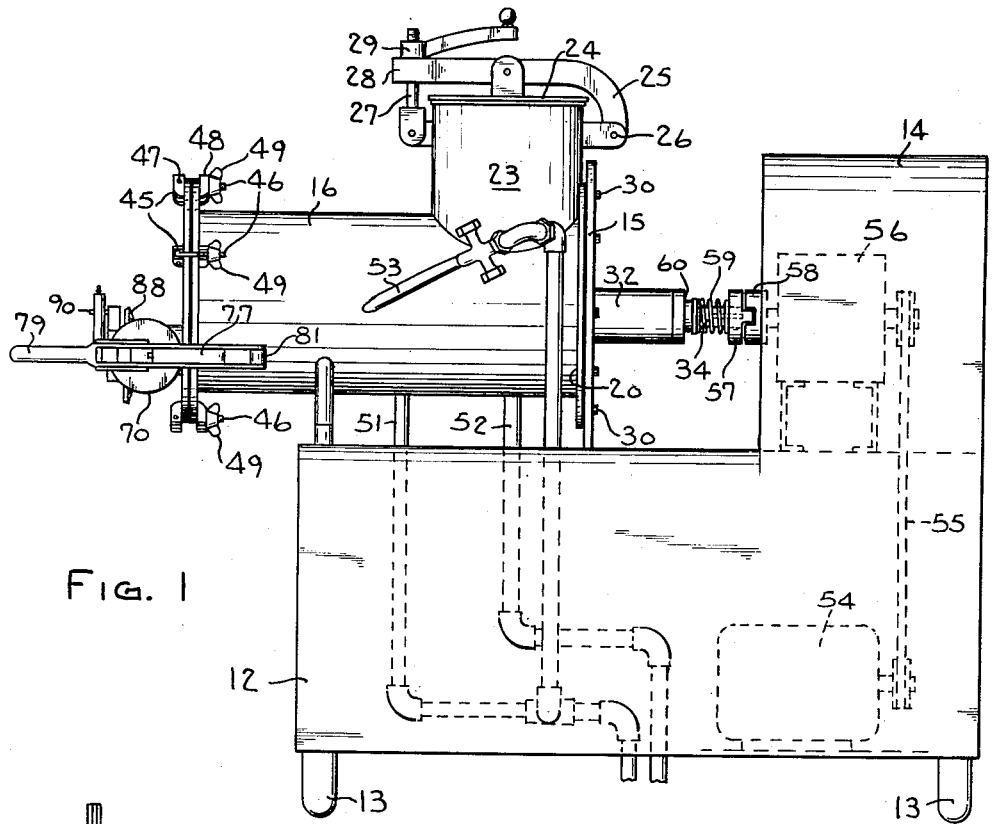
Fig. 1 is a side elevation view of a cooker embodying the invention.
Figure 2:
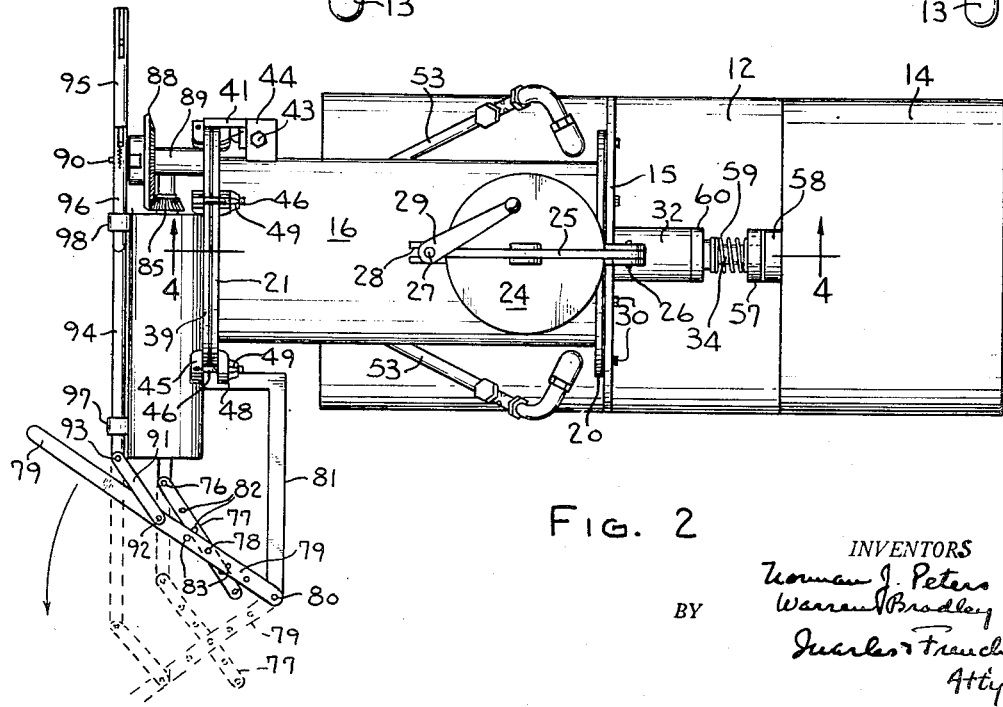
Fig. 2 is a plan view of the cooker.
Figure 3:
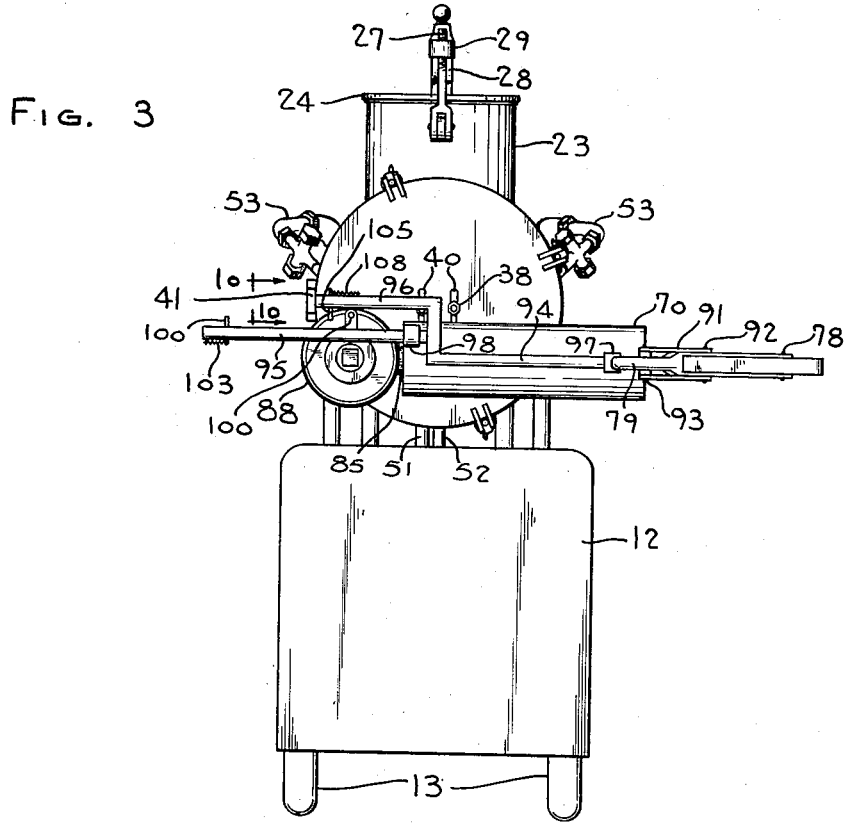
Fig. 3 is a front elevation view of the cooker.

Referring to Figs. 1 to 3, the numeral 12 designates a table or base structure provided with feet 13 and carrying a drive enclosing hood 14 and a barrel support and back end plate 15.

The barrel 16 has a horizontally disposed inner cylindrical wall 17, a similar outer wall 18 spaced therefrom to form a jacket space 19, annular end plates 20 and 21 welded to said walls 17 and 18 and a feed hopper extension 23 adjacent its back end normally covered by a cover 24 pivotally carried by a member 25 hinged at 26 and held in closed position by a hingedly mounted locking bolt 27 which extends through the forked end 28 of the member 25 and carries a clamping nut 29 engageable with said member.

The support plate 15 has the back end plate of the cylinder or barrel secured thereto by bolts 30 which extend through elongated slots 31 in the plate 15 to permit of eccentric adjustments of the feed screw as hereinafter described. The plate 15 has a cylindrical bearing support 32 disposed thereon carrying a bearing 33 in which one end 34 of a feed screw having spiral flights 35 is journalled, the other end 36 of said screw being journalled in a bearing 37 which is eccentrically adjustably clamped by bolts 38 to a front plate 39 which has elongated slots 40 in it for this purpose. The pins 21a are alinement pins for the plate 39.

Figure 10:
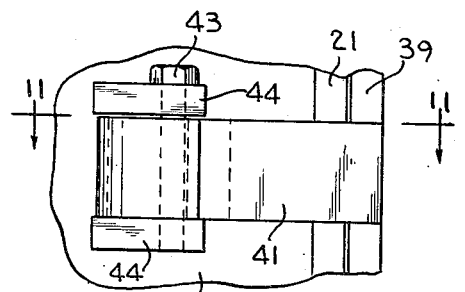
Fig. 10 is a detailed elevation view of the cover hinge.
Figure 11:
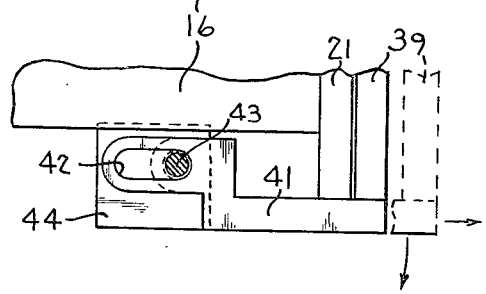
Fig. 11 is a plan view of the hinge with parts shown in a section taken on the line 11—11 of Fig. 10.
Figure 4:
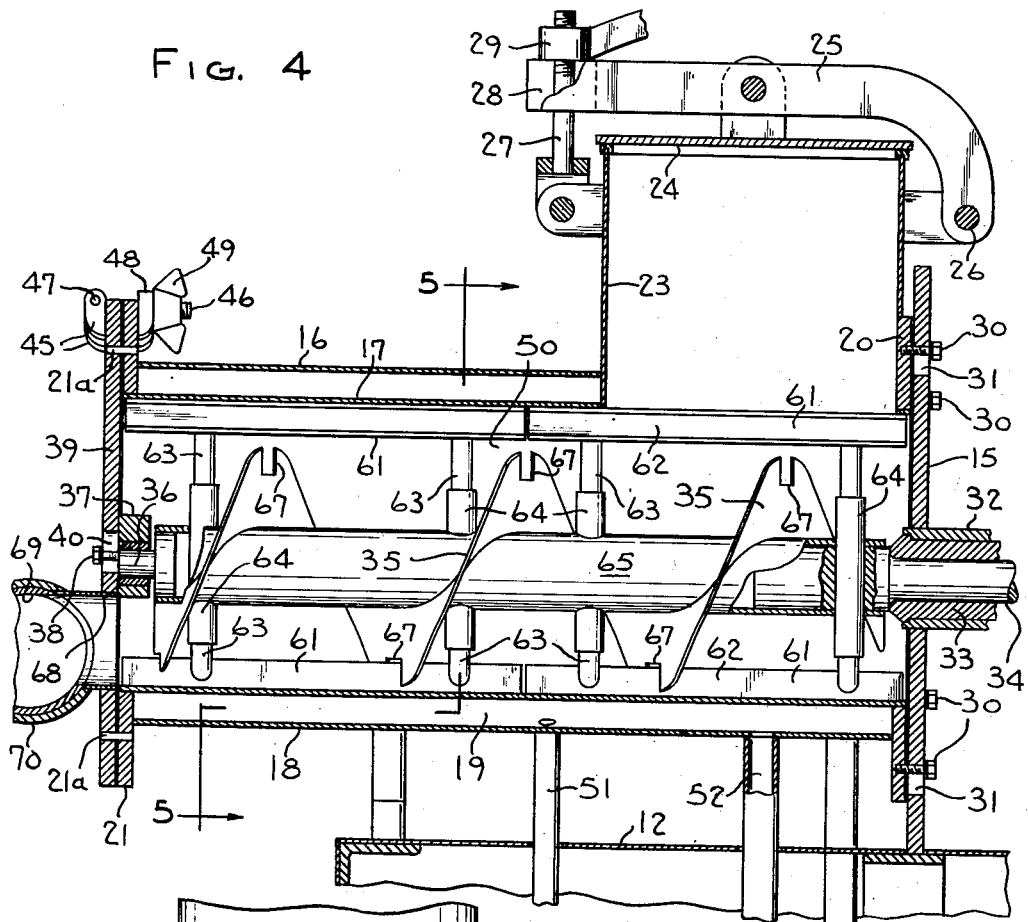
Fig. 4 is a vertical sectional view through the cooker taken on the line 4—4 of Fig. 2; parts being broken away.

Referring to Figs. 3, 10 and 11, the front plate 39 is provided with a hinge member 41 having an elongated slot 42 therein through which a hinge pin 43 carried by ears 44 welded to the side of the cylinder passes. In its closed position the plate 39 is tightly clamped to the end plate 21 by a series of clamps including a jaw member 45 having a clamping bolt 46 pivoted or hinged thereto at 47 and extending between portions of a jaw member 48 against which a wing nut 49 on the bolt 46 abuts when said clamp exerts a clamping pressure between the plates 39 and 21. When the clamps are removed, the plate 39 may then be moved forwardly to the dotted line position indicated in Fig. 11 due to the slot 42, this movement permitting disengagement of the bearing 37 from the end 36 of the feed screw after which the plate 39 may be swung outwardly about its hinge pin 43 so that full access may be had to the interior of the barrel. From Figs. 4 and 5 it will be noted that the cross sectional area of the feed screw is less than that of the barrel leaving a space 50 above the screw which permits back and forth passage of the material within the cooker, thus providing good agitation, faster cooking, and better mixing of the ingredients of the batch. The space 50 may be varied by the eccentric adjustment of the feed screw which it will be noted has a relatively fixed center of rotation in the end plate 15, but since the plate 20 is vertically adjustably mounted on said plate 15 by means of the slots 31 and the bearing 33 is vertically adjustably mounted through slots 40 on the plate 21, the relatively eccentric position of the axis of the feed screw in the barrel may be changed.

The jacket space 19 may be heated by steam through supply and return pipes 51 and 52, or live steam may be introduced directly into the cooker through pipes 53 which are preferably substantially tangentially disposed and inclined toward the front end of the cylinder to aid in the mixing action.

An electric motor 54 mounted in the base structure 12 is connected by a belt and pulley drive 55 with the input end of a speed reducer 56 mounted in the housing or hood 14, the output end of said reducer being connected to the shaft 34 of the feed screw by a jaw clutch, one member 57 of which is slidably keyed to the shaft 34 and urged into driving engagement with the other member 58 of said clutch by a spring 59 interposed between said member 57 and a sealing ring 60 abutting the outer end of the bearing support 32. Thus the shaft 34 may be readily disconnected from the member 57 of its drive clutch and pulled through the bearing 33 and removed from the barrel when the front bearing 37 has been disengaged from the front end 36 of the feed screw by the opening of the front plate 39 as previously described.

Figure 5:
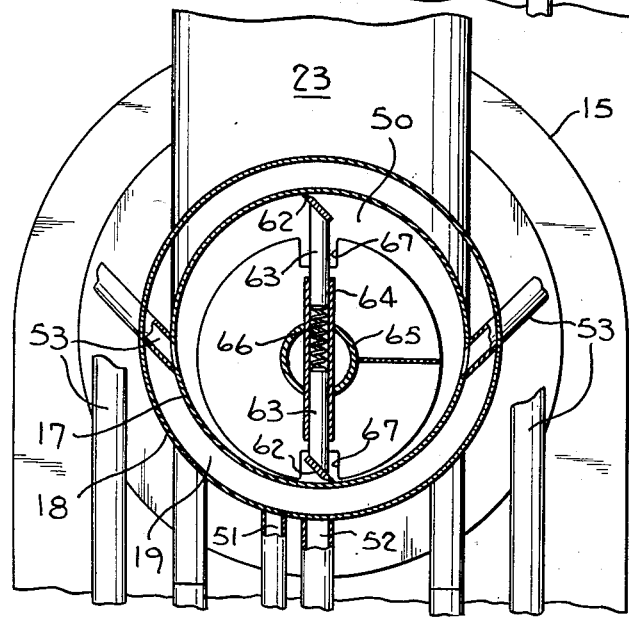
Fig. 5 is a vertical sectional view taken on the broken line 5—5 of Fig. 4.

In order to prevent burning of the material adjacent the inner walls of the barrel, especially when the same is heated by introduction of steam into the jacket space 19, a series of diametrically disposed yieldingly mounted scrapers 61 are provided. Each scraper includes a scraper blade 62 carried by rods 63 slidably mounted in cylindrical guide tubes 64 secured to the shaft portion 65 of the feed screw, the oppositely disposed pairs of scrapers being yieldably urged into contact with the walls of the inner cylinder by springs 66 interposed between the oppositely disposed rods 63 as shown in Fig. 5. The flights 35 of the feed screw are provided with diametrically disposed notches 67 to allow free movement of the blades 62 in any position of eccentric adjustment of the feed screw.

The removal of cooked material from the cylinder is controlled either by a pivoted plate of known construction mounted to control passage of said material from the outlet 68 in the front plate 39, or the removal of the cooked material may be controlled by a rotary two-way valve 69 mounted to rotate in a cylinder 70 fixed to the cover plate 15 and having an elongated discharge opening 71 adapted in one position to register with the outlet 68, as shown in Fig. 7, and in another position to register with a similar opening 72 in the cylinder 70, as shown in Fig. 9. For discharging a batch of material of a predetermined amount a piston 73 is slidably mounted in the valve 69, its rod 74 extending through an opening in the end 75 of the cylinder 70 and connected by a pin 76 to one end of a link 77 which is adjustably connected at its other end by a pin 78 to the intermediate portion of a hand lever 79 pivoted at one end 80 to a bracket 81 fixed to the cylinder 70. For varying the stroke of the piston 73 the link 77 is provided with spaced holes 82 and the lever 79 with spaced holes 83, so that a pin 78 may be inserted in any one of the holes 82 and 83.

Means are also provided for rotating the valve 69 from charge receiving to charge dispensing position on the movement of the lever 79. For this purpose a bevel gear 85 is keyed to a stud 86 mounted centrally on the closed end 87 of the valve 69 and meshing with a large bevel gear 88 mounted to turn freely on a stud shaft 89 fixed to the cover plate 15, said gear carrying a drive pin 90 adapted to be engaged alternatively by reciprocatory means operated by the lever 79. This means includes a link 91 operatively connected at one end by a pin 92 to the lever 79 and at its other end by a pin 93 to the outer end of a slide bar 94 having spaced arms 95 and 96 at its outer end. The main portion of the bar 94 is slidably mounted in a guide 97 fixed to the cylinder 70 while the arm 95 is slidably mounted in a guide 98 fixed to said cylinder. The arm 95 has a slot 99 near its outer end in which an upwardly projecting drive pin 100 is pivotally mounted on a pin 101, said pin being normally held in upright position against a stop shoulder 102 by a spring 103 and being located to engage the drive pin 90 of the gear 88. The arm 96 has a slot 104 near its outer end in which a downwardly projecting drive pin 105 is pivotally mounted on a pin 106, said pin being normally held in upright position against a stop shoulder 107 by a spring 108 and being located to engage the drive pin 90 of the gear 88. The pins 100 and 106 provide one way releasable drive connections between the bar 94 and the gear 88.

With the above construction as the lever 79 is moved to push the piston 73 inwardly to discharge material, the bar 94 is moved toward the left as viewed in Fig. 6 causing the pin 100 to engage the pin 90 and turn the gear 88 in a counterclockwise direction and hence the gear 85 with the valve 69 to the position in which the valve 69 alines with the opening 72, the pin 100 moving past the pin 90 after the valve 69 is open and the piston 73 moving towards the closed end of the valve to discharge material from the valve chamber until it reaches the end of its stroke, as shown in Fig. 8. During this movement the pin 105 tips back or rocks over the pin 90 as the arm 96 moves to the position shown in Fig. 8. On the reverse movement of the lever 79 the piston 73 is retracted or drawn outwardly relative to the valve chamber, and during the first part of this movement or the movement of the bar 94 to the right, the pin 105 engages the pin 90 and shifts the gear 88 from the position shown in Fig. 8 to the position shown in Fig. 6 and then moves past said pin 90 to the position shown in said Fig. 6 as the piston 73 completes its stroke. Movement of the gear 88 by the pin 105 causes said gear to turn the valve 69 from the position shown in Fig. 9 to the position shown in Fig. 7, and as the piston 73 completes its stroke, the pin 100 tips back or rocks over the pin 90 and assumes the position shown in Fig. 6 ready to again engage the pin 90 to open the valve 69 for the discharge of the next batch of cooked material. The bar 94 through its link connection with the lever 79 is always given a fixed stroke to shift the valve 79 to its different positions as noted above, but the adjustable connections between the piston 73 and the lever 79 permit the stroke of said piston 73 to be varied.

We desire it to be understood that this invention is not to be limited to any particular form or arrangement of parts except in so far as such limitations are included in the appended claims.

What we claim as our invention is:

1. In a cooker, the combination of a horizontally disposed barrel having end plates, one of said end plates being slidably and pivotally hinged to said barrel and carrying a bearing, a rotatable feed screw having one end mounted in said bearing from which it is removable on the sliding movement of said end plate and the other end journalled in and slidably removable from the other of said end plates when said first named end plate is swung outwardly on its hinged pivot away from said barrel.

2. In a cooker, the combination of an end plate having a bearing, a horizontally disposed barrel adjustably secured to said end plate to variably eccentrically dispose said bearing relative to said barrel, an end plate slidably and pivotally hinged to the other end of said barrel, a bearing adjustably secured to said last named end plate to eccentrically dispose the bearing relative to said barrel to aline this bearing with the first named bearing, a feed screw journalled in said bearings, and means for rotating said feed screw.

3. In a cooker, the combination of a fixed end plate having a bearing, a horizontally disposed barrel adjustably secured along one of its axes to said end plate to variably eccentrically dispose said bearing relative to said barrel, an end plate mounted on the other end of said barrel to form a removable closure therefor, a bearing adjustably secured to said last named end plate and adjustable relative thereto along the same axis as that of the barrel relative to said fixed end plate to eccentrically dispose said bearing relatively to said barrel to aline this bearing with the first named bearing, a feed screw journalled in said bearings, and means for rotating said feed screws.

NORMAN J. PETERS.
WARREN BRADLEY.

REFERENCES CITED

The following references are of record in the file of this patent:

UNITED STATES PATENTS

| Number | Name | Date |
| --- | --- | --- |
| 372,393 | Tunstill | Nov. 1, 1887 |
| 1,116,110 | Pfouts | Nov. 3, 1914 |
| 1,320,976 | Black | Nov. 4, 1919 |
| 1,928,571 | Petit | Sept. 26, 1933 |
| 2,022,205 | Kramer | Nov. 26, 1935 |
| 2,080,971 | Oltz | May 18, 1937 |
| 2,140,471 | Frolick et al. | Dec. 13, 1938 |
| 2,142,081 | Olive | Jan. 3, 1939 |
| 2,506,101 | Oltz | May 2, 1950 |